United States Patent
Ma

(10) Patent No.: US 10,051,334 B2
(45) Date of Patent: Aug. 14, 2018

(54) APPARATUS AND METHOD FOR RESUMING PLAYING OF MEDIA SOURCE, AND SMART TELEVISION

(71) Applicant: HISENSE ELECTRIC CO., LTD., Qingdao (CN)

(72) Inventor: Liming Ma, Qingdao (CN)

(73) Assignees: HISENSE ELECTRIC CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 0 days.

(21) Appl. No.: 15/393,725

(22) Filed: Dec. 29, 2016

(65) Prior Publication Data

US 2017/0111705 A1   Apr. 20, 2017

(30) Foreign Application Priority Data

Sep. 28, 2016   (CN) .......................... 2016 1 0861747

(51) Int. Cl.
| | |
|---|---|
| *H04N 21/44* | (2011.01) |
| *H04N 21/61* | (2011.01) |
| *H04N 21/438* | (2011.01) |
| *H04N 21/234* | (2011.01) |
| *H04N 21/433* | (2011.01) |
| *H04N 21/462* | (2011.01) |

(52) U.S. Cl.
CPC ... *H04N 21/6125* (2013.01); *H04N 21/23418* (2013.01); *H04N 21/4331* (2013.01); *H04N 21/4382* (2013.01); *H04N 21/4383* (2013.01); *H04N 21/4384* (2013.01); *H04N 21/44004* (2013.01); *H04N 21/4622* (2013.01)

(58) Field of Classification Search
None
See application file for complete search history.

(56) References Cited

U.S. PATENT DOCUMENTS

| | | | |
|---|---|---|---|
| 2014/0344700 A1* | 11/2014 | Kane | G11B 27/031 715/726 |
| 2015/0113571 A1* | 4/2015 | Cholas | H04N 21/4622 725/59 |
| 2016/0156969 A1* | 6/2016 | Novi | H04N 21/4147 725/88 |

* cited by examiner

*Primary Examiner* — Pankaj Kumar
*Assistant Examiner* — Charles N Hicks
(74) *Attorney, Agent, or Firm* — Harness, Dickey & Pierce, P.L.C.

(57) ABSTRACT

The disclosure provides an apparatus and method for resuming playing of a media source, where if a smart televisions switches from a first media source to a second media source, then buffered video data after the position where the first media source is being played while it is being switched will be obtained and stored. Since the buffered video data can be played for a period of time longer than the playing-start time of the media source, if the smart television switches from the second media source back to the first media source, then the buffered video data will be played, and playing of the first media source will be resumed from the end position of the buffered video data in the media source.

10 Claims, 4 Drawing Sheets

If a smart television switches from a first media source to a second media source, then obtain and store buffered video data after a playing position where the media source played before switching is being played while it is being switched — 101

If the smart television switches from the second media source back to the first media source, then play the buffered video data, and resume playing of the media source from an end position of the buffered video data in the media source — 102

APPARATUS AND METHOD FOR RESUMING PLAYING OF MEDIA SOURCE, AND SMART TELEVISION

CROSS-REFERENCE TO RELATED APPLICATION

This application claims benefit and priority of Chinese Patent Application No. 201610861747.5 filed Sep. 28, 2016. The entire disclosure of the above application is incorporated herein by reference.

FIELD

The present disclosure relates to the field of communications, and particularly to an apparatus and method for resuming playing of a media source, and a smart television.

BACKGROUND

This section provides background information related to the present disclosure which is not necessarily prior art.

As our sciences and technologies are developing constantly, there are more and more powerful functions of smart television. In order to offer a better experience of users accessing the smart television, the existing smart televisions typically support the multi-media source mode. After media sources are added to a smart television, a user can switch between the different media sources of live videos, movies, game, education programs, media centers, etc., to access their desirable video services. In view of this, the competitiveness of an smart television manufacturer in the industry is determined to some extent by the ability of the smart television manufacturer to enable its smart television product to switch between different media sources rapidly and efficiently to thereby guarantee smooth and comfortable conversion between the audio, video, or other media sources so as to improve the experience of the user accessing the smart television.

SUMMARY

This section provides a general summary of the disclosure, and is not a comprehensive disclosure of its full scope or all of its features.

Some embodiments of the disclosure provide an apparatus for resuming playing of a media source, the apparatus includes:

a first processing module is configured, when a media source is switched from a first media source to a second media source, to obtain and store buffered video data after a playing position where the first media source is being played while it is being switched; and a second processing module is configured, when the media source is switched from the second media source back to the first media source, to play the buffered video data, and to resume playing of the first media source from an end position of the buffered video data in the first media source.

Some embodiments of the disclosure further provide another apparatus for resuming playing of a media source, the apparatus includes a memory configured to store computer readable program, and at least one processor configured to execute the computer readable program:

when a media source is switched from a first media source to a second media source, obtain and store buffered video data after a playing position where the first media source is being played while it is being switched; and when the media source is switched from the second media source back to the first media source, play the buffered video data, and resume playing of the first media source from an end position of the buffered video data in the first media source.

Some embodiments of the disclosure further provide a method for resuming playing of a media source, applicable to an smart television supporting a multi-media source mode, the method includes:

when the smart television switches from a first media source to a second media source, obtaining and storing buffered video data after a playing position where the first media source is being played while it is being switched; and when the smart television switches from the second media source back to the first media source, playing the buffered video data, and resuming playing of the first media source from an end position of the buffered video data in the first media source.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Figure 1:
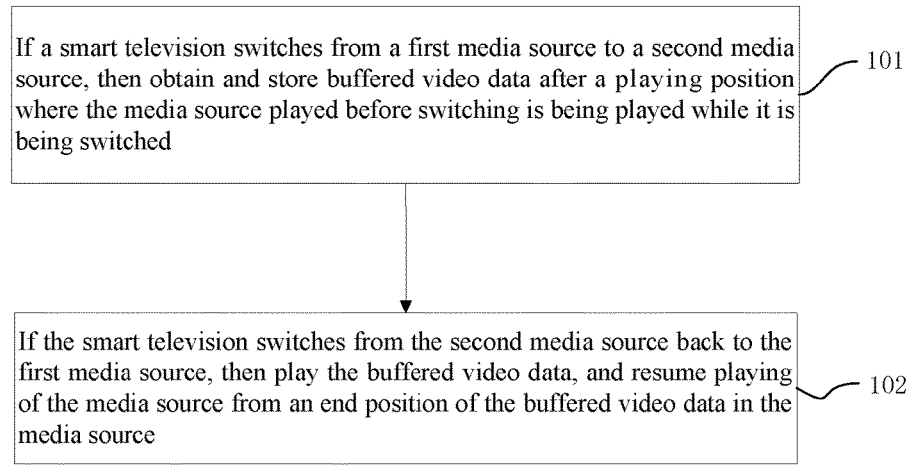
FIG. 1 is a schematic flow chart of a method for resuming playing of a media source according to some embodiments of the disclosure.

As illustrated in FIG. 1 which is a schematic flow chart of a method for resuming playing of a media source according to some embodiments of the disclosure, the method includes the following steps:

The step S101 is, if an smart television switches from a first media source to a second media source, to obtain and store buffered video data after a playing position where the media source played before switching is being played while it is being switched.

In some embodiments, the buffered video data can be played for a period of time longer than a playing-start time, and the playing-start time is the time when the first media source is ready for being played for the first time, or a preset time.

In related technologies, for example, if a media source is switched from an MMP to a DTV, then after a user sends an instruction to the smart television to switch the media source from the MMP to the DTV, firstly the DTV sends a message to a Resource Manager (RM), and the RM instructs the MMP to perform a reset operation, so that the smart television releases a resource, flushes a buffer, and records the current playing position. Stated otherwise, the media source is typically switched in the multi-media source mode by flushing data in a buffer area accessed while the current media source is being played, and only recording the current playing position, so that if the user subsequently switches back to the originally watched media source from another media source, then the smart television will seek the previously recorded playing position, and further resume playing from that position. However this seek operation is performed based upon I frames (i.e., key frames), and if there are a small number of I frames in the played media source, then the smart television will seek by locating an I frame at a long distance from the current playing position, and starting playing from this I frame, thus resulting in a jump from a resumed picture to a picture played before the media source is switched. For example, a video is played at a position of the $53^{rd}$ second, but since there are such a small number of I frames in the media source that there are only I frames at the $50^{th}$ and $55^{th}$ seconds, the video may be resumed from the located I frame, that is, the video may start being played from the $50^{th}$ or $55^{th}$ second, thus resulting in a jump from resumed picture to a picture played before the video is switched; and secondly it may take a period of time to load the media source or to decode the video after the user switches back (the period of time for loading is dependent upon a network speed, and the period of time for decoding typically ranges from 1 to 2 seconds), thus resulting in inconsecutive playing of the media source after the media source is switched, so that the smart television cannot guarantee seamless transition of the contents from the media source switched back and forth in the multi-media source mode, which may discourage the experience of the user accessing the smart television.

In embodiments of the disclosure, a segment of video data from the current playing position to some position following the current playing position can be stored, so that subsequently this segment of video data can be played directly to thereby resume playing of the media source, thus avoiding in effect such a problem that there are a small number of I frames in the media source so that playing of the media source may be resumed at an offset position, thus resulting in a jump from a resumed picture to a picture played before the media source is switched, and such a problem that the resumed picture may be played inconsecutively due to a wait for loading.

Further to the description above, in the embodiments of the disclosure, if the smart television switches from the first media source to the second media source, then the buffered video data after a playing position where the media source played before switching is being played while it is being switched will be obtained and stored, so that the stored video data can be played directly to thereby resume playing of the media source. In an implementation scenario, in embodiments of the disclosure, a temporary buffer area can be further arranged, determined video data can be stored into the temporary buffer area as the buffered video data, and the data in the temporary buffer area will not be flushed when the smart television switches from the first media source to the second media source, so that the stored buffered video data can be played directly upon subsequent switching back to the media source to thereby resume playing of the media source for the purpose of rapid resumption of playing so as to improve the experience of the user. Of course, the determined video data can alternatively be stored into another storage space, but the embodiments of the disclosure will not be limited to any particular scheme to store them; and the first media source and the second media source as referred to in the embodiments of the disclosure can be an MMP and a DTV, or can be other media sources, but the embodiments of the disclosure will not be limited to any particular media sources.

In some embodiments of the disclosure, the method further includes the following steps:

When the media source starts being played for the first time, the playing-start time, and a playing bit rate corresponding to the media source are obtained.

Since in some embodiments of the disclosure, the buffered video data to be obtained need to be calculated so that they can be played as required for resuming playing of the media source, the playing-start time, and the playing bit rate corresponding to the media source need to be obtained when the media source starts being played for the first time.

The video data after a playing position where the media source played before switching is being played while it is being switched can be obtained and stored by obtaining the first I frame after the playing position; determining whether video data between the playing position and the first I frame can be played for a period of time longer than the playing-start time; and if so, then storing the video data as the buffered video data; otherwise, further obtaining a next I frame following the first I frame until video data between the playing position and the next I frame can be played for a period of time longer than the playing-start time.

Since in some embodiments of the disclosure, it needs to be determined that the buffered video data can be played for a period of time as required for resuming playing of the media source, the video data obtained from the current playing position to some position after the current playing position need to be determined so that only the video data satisfying the playing condition can be determined as the buffered video data and stored, so that the stored buffered video data can be invoked directly for the next time of resuming playing of the media source, and such a problem that there are a small number of I frames in the media source so that playing of the media source may be resumed at an offset position, thus resulting in a jump from a resumed picture to a picture played before the media source is switched, and such a problem that the resumed picture may be played inconsecutively due to a wait for loading can be avoided in effect.

Figure 6:
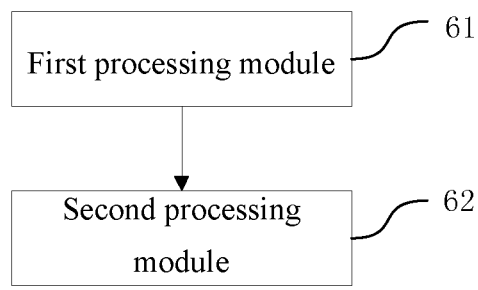
FIG. 6 is a schematic structural diagram of an apparatus for resuming playing of a media source according to some embodiments of the disclosure.

In an application scenario, in some embodiments of the disclosure, it can be determined whether the video data between the playing position and the I frame can be played for a period of time longer than the playing-start time by obtaining the capacity of the video data; determining the period of time for which the video data can be played, according to the capacity and the playing bit rate; comparing the period of time for which the video data can be played, with the length of time corresponding to the playing-start time; and if the length of time of the period of time for which the video data can be played is longer than the length of time corresponding to the playing-start time, then determining that the period of time for which the video data can be played is longer than the playing-start time; otherwise, determining that the period of time for which the video data can be played is no longer than the playing-start time. It shall be noted that the period of time for which the video data between the current playing position and the I frame can be played can be determined according to the previously obtained playing-start time, and a playing bit rate corresponding to the media source. As illustrated in FIG. 6, there is a flow chart of calculating the capacity of stored data among the buffered video data according to some embodiments of the disclosure. After an I frame after the current position is located, video data from the current playing position to the I frame are obtained from the buffered data, then a period of time for which the video data can be played is calculated according to the bit rate of the media source (the period of time for which the video data can be played is calculated as the amount of the video data multiplied by 8 divided by the bit rate), and the calculated period of time for which the video data can be played is compared with the playing-start time, so that the video data which can be played for a period of time longer than the playing-start time are determined and stored.

In some embodiments of the disclosure, such video data among the buffered data are determined that can be played for a period of time longer than the playing-start time, where the difference between the period of time for which the video data can be played, and the playing-start time is below a preset threshold, so that a lower proportion of the temporary storage space can be occupied, that is, a lower proportion of the storage space can be occupied by such video data among the buffered data that the difference between the period of time for which the video data can be played, and the playing-start time is below the preset threshold, as compared with preloaded video data to be played normally, so that a proportion of the storage space will be occupied as low as possible while improving the experience of the user while the media source is being switched.

Of course, the steps as referred to in the steps may be modified in an application scenario, so they may be performed in the following three implementation instances:

In a first instance, firstly the I frame is sought and the video data are stored, and then the media source is switched, in response to a received switching instruction.

In a second instance, firstly the media source is switched, and then the I frame is sought and the video data are stored, in response to a received switching instruction.

In a third instance, the I frame is sought and the video data are stored while the media source is being switched, in response to a received switching instruction.

Here subsequently the buffer is flushed, the decoder is released, the position is recorded, etc., in all the three instances above.

The three instances above have their respective advantages and disadvantages, so they may be selected and arranged as needed in a real application without departing from the scope of the disclosure as claimed.

The step S102 is, when the smart television switches from the second media source back to the first media source, to play the buffered video data, and to resume playing of the media source from the end position of the buffered video data in the media source after the buffered video data are played.

As described above, if the media source is switched from the second media source back to the first media source, then the previously stored buffered video data can be played for resuming playing of the media source, thus avoiding in effect such a problem that there are a small number of I frames in the media source so that playing of the media source may be resumed at an offset position, thus resulting in a jump from a resumed picture to a picture played before the media source is switched, and such a problem that the resumed picture may be played inconsecutively due to a wait for loading, for the purpose of seamless transition and rapid resumption of playing.

Further to the description above, firstly the I frame corresponding to the buffered vide data is sought at the position thereof in the media source; and then the video data after the I frame corresponding to the buffered video data are loaded or decoded, and the loaded or decoded video data are buffered; and of course, the video data after the end position of the buffered video data can be further loaded or decoded, and buffered, for the purpose of seamless transition and rapid resumption of playing.

It shall be noted that playing of the media source is resumed from the playing position stored in the buffered video data in this step to thereby address such a problem that there are a small number of I frames in the media source so that playing of the media source may be resumed at an offset position, thus resulting in a jump from a resumed picture to a picture played before the media source is switched, and such a problem that the resumed picture may be played inconsecutively due to a wait for loading the media source or decoding the video after switching back to the media source.

The technical solutions according to embodiments the disclosure will be described below clearly and fully with reference to the drawings in embodiments of the disclosure, and apparently the embodiments to be described will be only a part but all of embodiments of the disclosure. Based upon the embodiments of the disclosure here, all of other embodiments derived by those ordinarily skilled in the art without any inventive effort shall come into the scope of the disclosure.

Figure 5:
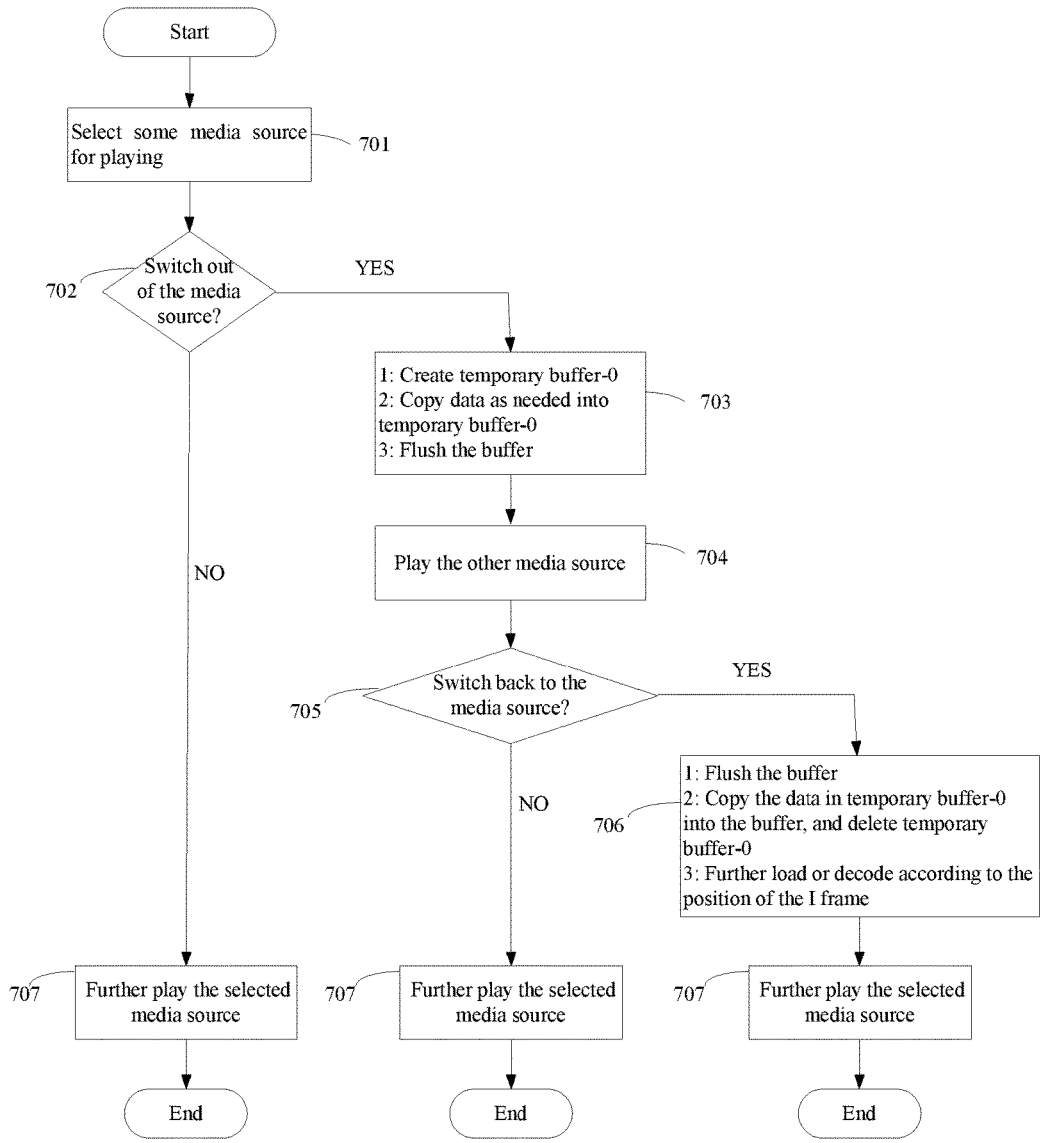
FIG. 5 is a schematic flow chart of a method for resuming playing of a media source rapidly after the media source is switched in an application scenario according to some embodiments of the disclosure.

As illustrated in FIG. 5, a method for resuming playing of a media source rapidly after the media source is switched according to some embodiments of the disclosure includes the following steps:

The step S501 is to search for and play by the device the media source in response to an obtained operation instruction which can be obtained by the device as a result of an automatic analysis, or which can be input by the user as needed while accessing the device.

The step S502 is to switch out of the media source in response to a switching-out instruction sent by the Resource Manager (RM).

Figure 2:
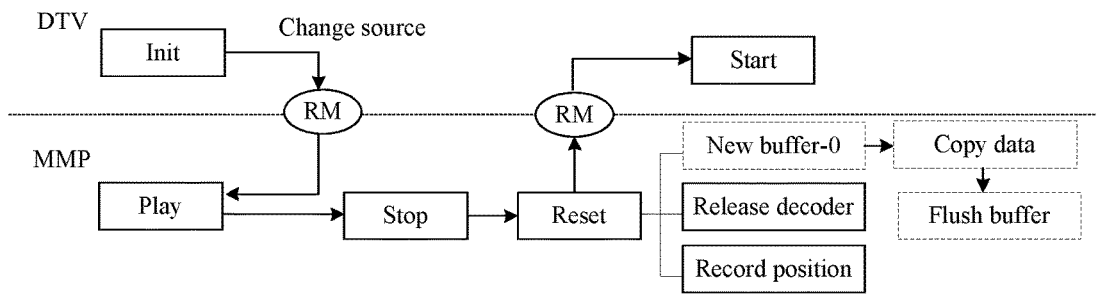
FIG. 2 is a schematic flow chart of switching a media source from an MMP to a DTV according to some embodiments of the disclosure.

FIG. 2 illustrates a flow chart of switching a media source from an MMP to a DTV according to embodiments of the disclosure. The Resource Manager (RM) instructs the MMP in response to a switching request to stop the media source, and if the MMP does not obtain any switching instruction, then the MMP will terminate the stop operation, and jump to the step S507 where the media source in the step S501 is further played; otherwise, the MMP will jump to the step S503.

In the step S503, the MMP performs the stop operation and the switching-out operation, creates a temporary buffer area buffer-0, and stores the data as needed into the temporary buffer area buffer-0, and then flushes the buffer, etc.

In some embodiments of the disclosure, the capacity of data to be stored further needs to be calculated, and still taking FIG. 2 as an example, the Resource Manager (RM) instructs the MMP in response to the switching request to stop the media source, and the MMP performs the stop operation, and then performs the reset operation by firstly creating the temporary buffer area buffer-0; determining the current playing position after the period of time for which the currently played media source has been played; seeking the position of an I frame after the current playing position, in the data loaded or decoded into the buffer according to positional information of I frames in the media source recorded by the MMP; if the first I frame is located, then determining the capacity of the data between the current playing position and the first I frame, and a bit rate according to data information recorded by the MMP, calculating a period of time for which the data can be played, as the capacity of the data multiplied by 8 divided by the bit rate, and if the period of time for which the data can be played is shorter than the playing-start time of the media source, then further seeking the position of a next I frame forward until the period of time for which the data can be played is longer than the playing-start time of the media source, where the playing-start time of the media source can be the time, recorded by the MMP, when the media source is ready for being played for the first time, or can be the time preset for the specific media source.

The data between the current playing position and the determined position of the I frame are obtained and stored into the temporary buffer area buffer-0 in which all the data are stored including decoded or downloaded audio and video data, a subtitle, and other data information, where the stored data can be preset flexibly as needed in an application scenario.

Figure 4:
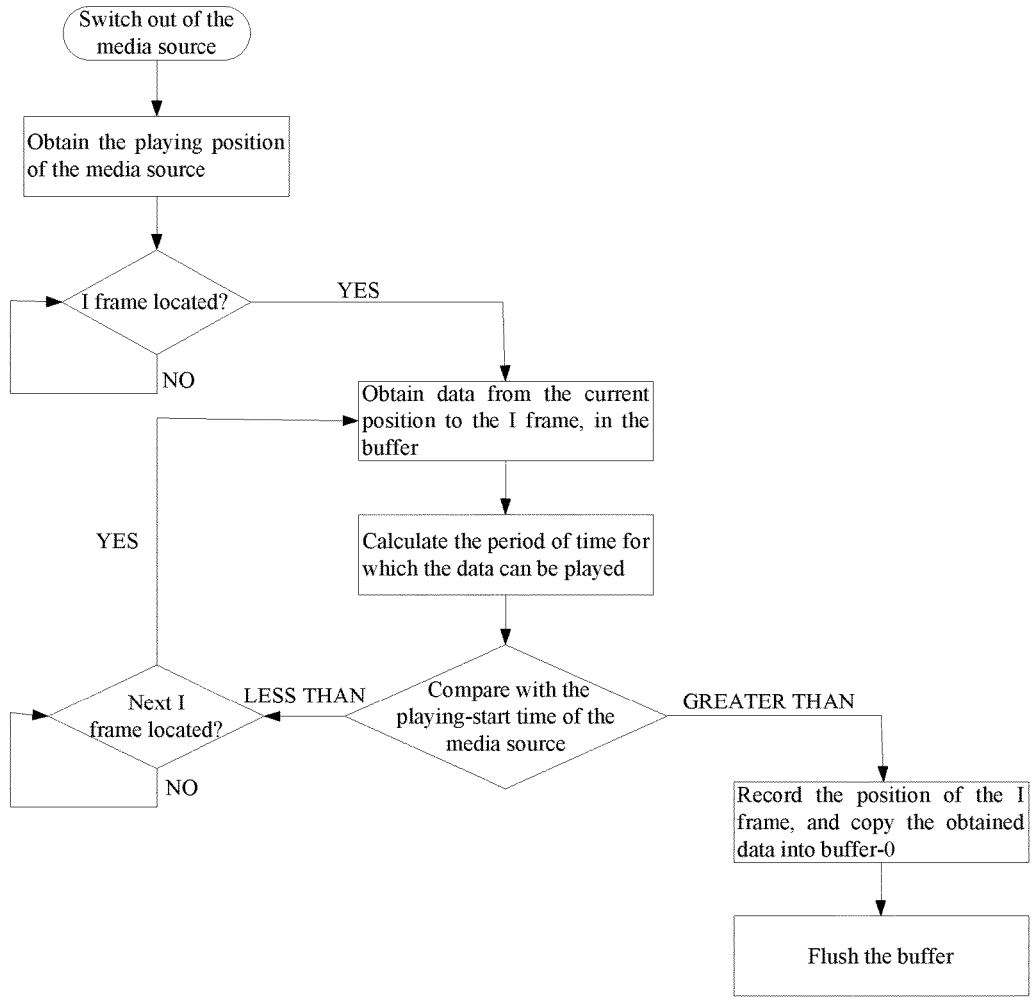
FIG. 4 is a schematic flow chart of calculating the capacity of stored data among buffered video data.

As illustrated in FIG. 4, after the data as needed are stored into the temporary buffer area buffer-0, the buffer is flushed, the decoder is released, the position is recorded, etc.

The step S504 is, if an instruction sent by the Resource Manager (RM) to apply the media source is received, to play the media source; otherwise, to remain idle.

The step S505 is, if there is a need to switch back to the original media source, to send by the device a switching-back request to the Resource Manager (RM), and to receive an instruction sent by the Resource Manager (RM) to confirm the request for switching back to the original media source; or if the device switches back upon reception of an instruction sent by the Resource Manager (RM) to confirm the request for switching back to the original media source, to jump to the step S506; otherwise, to jump to the step S507.

Figure 3:
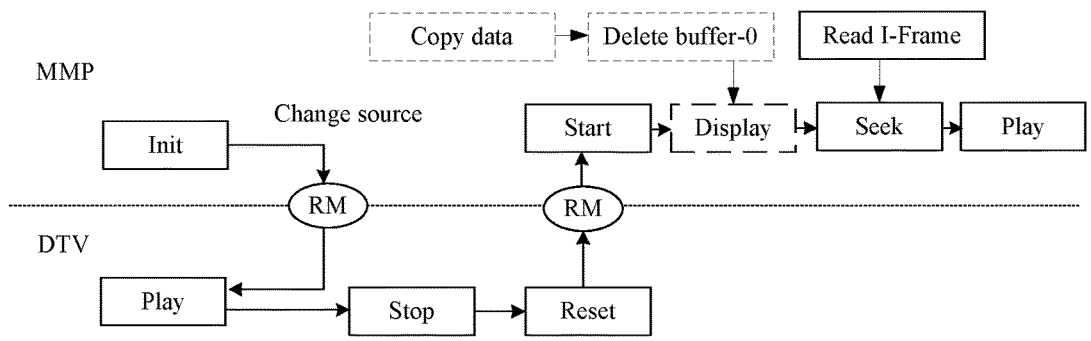
FIG. 3 is a schematic flow chart of switching a media source from a DTV to an MMP according to some embodiments of the disclosure.

FIG. 3 illustrates a flow chart of switching a media source from a DTV to an MMP according to some embodiments of the disclosure, where if the MMP needs to switch back to the original media source, then the Resource Manager (RM) will send an instruction to the DTV in response to a switching-back request, and the DTV will perform stop and reset operations, etc.

At this time, if the MMP confirms the request for switching back to the original media source, then switching back to the original media source.

If the MMP does not confirms the request for switching back to the original media source, then further playing the current media source or remaining idle.

In the step S506, the MMP confirms the request for switching back to the original media source, so the MMP firstly flushes the buffer, then copies the data stored in the temporary buffer area buffer-0 into the buffer, flushes the temporary buffer area buffer-0, and thereafter further plays the media source from the position of the lastly played I frame stored among the data in the buffer, and further load or decode the data forward.

As illustrated in FIG. 3, the MMP switches back to the media source by firstly copying the data stored in the temporary buffer area buffer-0 into the buffer, and then flushing the temporary buffer area buffer-0, and the display device loads or decodes and displays the data in the buffer as pictures, and further loads or decodes and buffers the video data after the stored video data.

The step S507 is to further play the currently selected media source.

With the technical solution according to some embodiment of the disclosure, the buffered video data are played, and playing of the media source is resumed from the end position of the buffered video data in the media source, so that the smart television can guarantee consecutive video pictures before and after switching back and forth in the multi-media source mode to thereby guarantee consecutive contents of the media source.

Based upon the same inventive idea as the method above, some embodiments of the disclosure further provide an apparatus for resuming playing of a media source, and FIG. 6 illustrates a schematic structural diagram of the apparatus including the following modules:

A first processing module 81 is configured, if an smart television switches from a first media source to a second media source, to obtain and store buffered video data after a playing position where the media source played before switching is being played while it is being switched; and A second processing module 82 is configured, if the smart television switches from the second media source back to the first media source, to play the buffered video data, and to resume playing of the media source from the end position of the buffered video data in the media source.

In some embodiments of the disclosure, the buffered video data can be played for a period of time longer than a playing-start time, and the playing-start time is the time when the first media source is ready for being played for the first time, or a preset time.

In some embodiments of the disclosure, the first processing module 81 is configured to obtain and store the buffered video data after the playing position by:

obtaining a first I frame after the playing position;

determining whether video data between the playing position and the first I frame can be played for a period of time longer than the playing-start time; and If so, storing the video data as the buffered video data;

Otherwise, further obtaining a next I frame until video data between the playing position and the next I frame can be played for a period of time longer than the playing-start time.

In some embodiments of the disclosure, the apparatus further includes:

An initializing module 83 is configured to obtain the playing-start time, and a playing bit rate corresponding to the media source when the media source starts being played for the first time.

In some embodiments of the disclosure, the first processing module 81 is configured to determine whether the video data between the playing position and the first I frame can be played for a period of time longer than the playing-start time by:

obtaining the capacity of the video data;

determining the period of time for which the video data can be played, according to the capacity and the playing bit rate;

comparing the period of time for which the video data can be played, with the length of time corresponding to the playing-start time; and If the length of time of the period of time for which the video data can be played is longer than the length of time corresponding to the playing-start time, determining that the period of time for which the video data can be played is longer than the playing-start time;

Otherwise, determining that the period of time for which the video data can be played is no longer than the playing-start time.

In some embodiments of the disclosure, the second processing module 82 is configured to resume playing of the media source from the end position of the buffered video data in the media source by:

seeking an I frame corresponding to the buffered video data at the position thereof in the media source;

loading or decoding video data after the I frame; and loading the I frame corresponding to the buffered video data, or buffering the decoded video data.

The respective modules in embodiments of the disclosure can be integrated together, or can be deployed separately, and these modules can be combined into one module, or can be subdivided into a plurality of sub-modules.

Based upon the same inventive idea as the method above, some embodiments of the disclosure further provide an apparatus for resuming playing of a media source, where the apparatus includes a memory configured to store computer readable program, and at least one processor configured to execute the computer readable program:

If a media source is switched from a first media source to a second media source, to obtain and store buffered video data after a playing position where the first media source is being played while it is being switched; and If the media source is switched from the second media source back to the first media source, to play the buffered video data, and to resume playing of the first media source from the end position of the buffered video data in the first media source.

In some embodiments, the buffered video data can be played for a period of time longer than the time when the first media source starts being played, and the playing-start time is the time when the first media source is ready for being played for the first time, or a preset time.

In some embodiments of the disclosure, the processor is configured to execute the computer readable program to obtain and store the buffered video data after the playing position by:

obtaining a first key frame after the playing position;

determining whether video data between the playing position and the first key frame can be played for a period of time longer than the playing-start time; and If so, storing the video data as the buffered video data;

Otherwise, further obtaining a next key frame following the first key frame until video data between the playing position and the next key frame can be played for a period of time longer than the playing-start time.

In some embodiments of the disclosure, the processor is further configured to execute the computer readable program:

To obtain the playing-start time, and a playing bit rate corresponding to the first media source when the first media source starts being played for the first time.

In some embodiments of the disclosure, the processor is configured to execute the computer readable program to determine whether the video data between the playing position and the key frame can be played for a period of time longer than the playing-start time by:

obtaining the capacity of the video data;

determining the period of time for which the video data can be played, according to the capacity and the playing bit rate;

comparing the period of time for which the video data can be played, with the length of time corresponding to the playing-start time; and If the length of time of the period of time for which the video data can be played is more than the length of time corresponding to the playing-start time, determining that the period of time for which the video data can be played is longer than the playing-start time;

Otherwise, determining that the period of time for which the video data can be played is no longer than the playing-start time.

In some embodiments of the disclosure, the processor is configured to execute the computer readable program to resume playing of the first media source from the end position of the buffered video data in the first media source by:

seeking video data after a key frame corresponding to the buffered video data according to the position of the key frame in the first media source;

loading or decoding the video data after the key frame; and buffering the loaded or decoded video data.

Based upon the same inventive idea as the method above, some embodiments of the disclosure further provides a smart television including the apparatus for resuming playing of a media source as described above.

Those skilled in the art can clearly appreciate from the foregoing description of the embodiments that the embodiments of the disclosure can be implemented in software plus a necessary general hardware platform or, of course, in hardware, although the former implementation is preferred in many cases. Based upon such understanding, the technical solutions of the embodiments of the disclosure in essence or the part thereof contributing to the prior art can be embodied in the form of a software product which can be stored in a storage medium, and which includes several instructions to cause a computer device (e.g., a personal computer, a server, a network device, etc.) to perform the method according to the respective embodiments of the disclosure.

Those skilled in the art can appreciate that the drawings are merely schematic diagrams of the preferred embodiments, and the modules or the flows in the drawings may not be necessary to the embodiments of the disclosure.

The embodiments of the disclosure have been numbered only for the sake of a convenient description but will not suggest any superiority of one embodiment to another.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An apparatus for resuming playing of a media source, the apparatus comprising a memory configured to store computer readable programs, and at least one processor configured to execute the computer readable programs to:

in response to a media source being switched from a first media source to a second media source, obtain a first key frame after a playing position where the first media source is being played while it is being switched, determine whether video data between the playing position and the first key frame can be played for a period of time longer than a playing-start time of the first media source, and if so, flush a buffer area, create a temporary buffer area and store the video data in the temporary buffer area as buffered video data after the playing position, otherwise, obtain a next key frame following the first key frame until video data between the playing position and the next key frame can be played for a period of time longer than the playing-start time; and in response to the media source being switched from the second media source back to the first media source, flush the buffer area, put the buffered video data stored in the temporary buffer area in the buffer area, delete the temporary buffer area, play the buffered video data, and resume playing of the first media source from an end position of the buffered video data in the first media source;

wherein the buffered video data can be played for a period of time longer than the playing-start time of the first media source, and wherein the playing-start time is the time when the first media source is ready for being played for the first time or a preset time.

2. The apparatus according to claim 1, wherein the at least one processor is configured to execute the computer readable programs to obtain the playing-start time and a playing bit rate corresponding to the first media source when the first media source starts being played for the first time.

3. The apparatus according to claim 2, wherein the at least one processor is configured to execute the computer readable programs to:

obtain a capacity of the video data;
determine the period of time for which the video data can be played, according to the capacity and the playing bit rate;
compare the period of time for which the video data can be played with the length of time corresponding to the playing-start time; and
if the length of time of the period of time for which the video data can be played is more than the length of time corresponding to the playing-start time, determine the period of time for which the video data can be played is longer than the playing-start time;
otherwise, determine the period of time for which the video data can be played is no longer than the playing-start time.

4. The apparatus according to claim 1, wherein the at least one processor is configured to execute the computer readable programs to:

seek video data after a key frame corresponding to the buffered video data according to the position of the key frame in the first media source;
load or decode the video data after the key frame; and
buffer the loaded or the decoded video data.

5. A method for resuming playing of a media source, the method comprising:

in response to a smart television being switched from a first media source to a second media source, obtaining a first key frame after a playing position where the first media source is being played while it is being switched, determining whether video data between the playing position and the first key frame can be played for a period of time longer than a playing-start time of the first media source, and if so, flushing a buffer area, creating a temporary buffer area, and storing the video data as buffered video data after the playing position, otherwise obtaining a next key frame following the first key frame until video data between the playing position and the next key frame can be played for a period of time longer than the playing-start time; and in response to the smart television being switched from the second media source back to the first media source, flushing the buffer area, putting the buffered video data stored in the temporary buffer area in the buffer area, deleting the temporary buffer area, playing the buffered video data, and resume playing of the first media source from an end position of the buffered video data in the first media source;

wherein the buffered video data can be played for a period of time longer than the playing-start time of the first media source, and wherein the playing-start time is the time when the first media source is ready for being played for the first time or a preset time.

6. The method according to claim 5, further comprising obtaining the playing-start time and a playing bit rate corresponding to the first media source when the first media source starts being played for the first time before the smart television is switched from the first media source to the second media source.

7. The method according to claim 6, wherein determining whether the video data between the playing position and the first key frame can be played for a period of time longer than the playing-start time comprises:

obtaining a capacity of the video data;
determining the period of time for which the video data can be played, according to the capacity and the playing bit rate;
comparing the period of time for which the video data can be played with the length of time corresponding to the playing-start time; and
if the length of time of the period of time for which the video data can be played is more than the length of time corresponding to the playing-start time, determining the period of time for which the video data can be played is longer than the playing-start time;
otherwise, determining the period of time for which the video data can be played is no longer than the playing-start time.

8. The method according to claim 5, wherein resuming playing of the first media source from the end position of the buffered video data in the first media source comprises:

seeking video data after a key frame corresponding to the buffered video data according to the position of the key frame in the first media source;
loading or decoding the video data after the key frame; and
buffering the loaded or the decoded video data.

9. The method according to claim 5, wherein storing the video data comprises storing the video data after the playing position where the first media source is being played while it is being switched.

10. A method for resuming playing of a media source, the method comprising:

in response to a smart television being switched from a first media source to a second media source, obtaining buffered video data after a playing position where the first media source is being played while it is being switched, flushing a buffer area, creating a temporary buffer area, and storing the buffered video data after the playing position; and in response to the smart television being switched from the second media source back to the first media source, flushing the buffer area, putting the buffered video data stored in the temporary buffer area into the buffer area, deleting the temporary buffer area, playing the buffered video data, and resume playing of the first media source from an end position of the buffered video data in the first media source.

* * * * *